United States Patent [19]

Heystek

[11] 4,124,299
[45] Nov. 7, 1978

[54] METHOD AND APPARATUS FOR SURVEYING CLEARANCES ON RAILWAY TRACKS

[75] Inventor: Adriaan Heystek, Bilthoven, Netherlands

[73] Assignee: Electrorail N.V., Utrecht, Netherlands

[21] Appl. No.: 591,074

[22] Filed: Jun. 27, 1975

Related U.S. Application Data

[63] Continuation-in-part of Ser. No. 385,695, Aug. 6, 1973, abandoned.

[51] Int. Cl.² ............................................. G01B 11/24
[52] U.S. Cl. ..................................... 356/397; 33/1 Q; 350/10; 356/21; 356/394
[58] Field of Search ...................... 350/10; 356/20, 21, 356/168, 171, 247; 33/1 Q

[56] References Cited

U.S. PATENT DOCUMENTS

| | | | |
|---|---|---|---|
| 2,674,152 | 4/1954 | Wilkinson | 350/30 |
| 2,942,345 | 6/1960 | Goldberg | 350/10 |
| 3,695,769 | 10/1972 | Mason | 356/168 |

Primary Examiner—John K. Corbin
Assistant Examiner—R. A. Rosenberger
Attorney, Agent, or Firm—Snyder, Brown & Ramik

[57] ABSTRACT

A method of comparing circumferential shapes, particularly the outer circumference of a desired clearance wth the real clearance between obstacles arranged alongside a railway track, for example, signalling posts, overhead structures and quay walls, wherein from a point on the railway track, with the aid of field-glasses, in the viewing field of which is arranged an image of the outer circumference of the desired clearance made from a given distance, the real clearance is observed in the direction of length of the track at said given distance.

6 Claims, 3 Drawing Figures

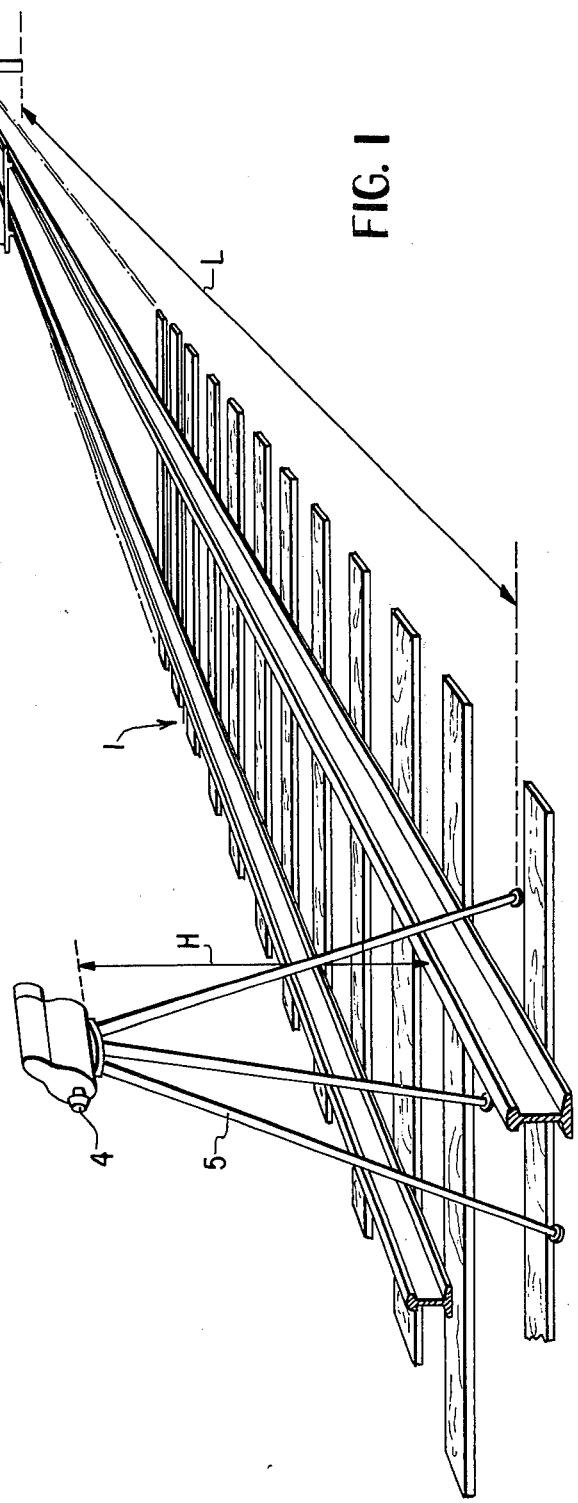
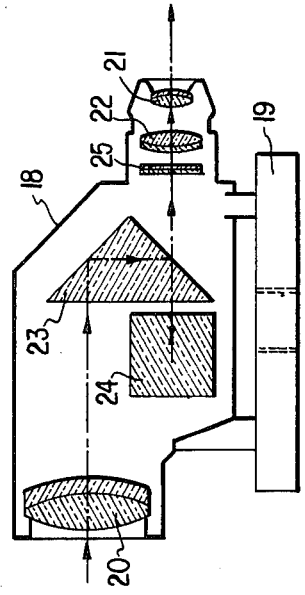
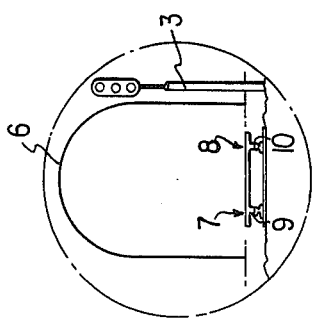
FIG. 1
FIG. 2
FIG. 3

METHOD AND APPARATUS FOR SURVEYING CLEARANCES ON RAILWAY TRACKS

CROSS REFERENCE TO RELATED APPLICATION

This application is a continuation-in-part of my copending U.S. patent application Ser. No. 385,695 filed Aug. 6, 1973 and now abandoned.

BACKGROUND OF THE INVENTION

The present invention concerns the surveying of clearances on a railway track to ensure that adequate clearances are maintained for normal traffic and more especially to determine whether sufficient clearance is available for exceptional loads.

It is well known that to avoid contact of any part of a train with obstacles adjacent the track, such as signalling posts, overhead structures, platforms, roofs, bridges, and viaducts, it is important to maintain sufficient clearance to allow for the transverse movements of the train which occur when it is travelling at speed. Such clearances will allow exceptional loads to be transported at low speeds but because the clearances are not uniform in size from one line to another it is often necessary to survey a route in detail before transporting an exceptional load. In the past this has been done by determining the dimensions of the wagon and its load and then measuring the space available at points along the track where it was doubtful whether sufficient clearance existed. Obviously this is a time-consuming method and it is an object of the invention to provide a more convenient method of assessing whether the required clearance is available.

BRIEF SUMMARY OF THE INVENTION

In accordance with the invention there is provided a method of surveying clearances on a railway track comprising placing a marker at a point to be surveyed and observing the marker from a distance along the track by means of a telescope which incorporates a clearance gauge visible in the field of view of the telescope, the clearance gauge including reference marks which are brought into coincidence with corresponding reference marks on the marker to establish the correct observation position, whereupon obstacles at the point to be surveyed are observed relative to the clearance gauge to determine whether the clearances are sufficient.

The apparatus in accordance with the invention for carrying out this method thus comprises a marker to be placed at the point to be surveyed, the marker having reference marks observable from a distance along the track, and a telescope incorporating a clearance gauge visible in the field of view of the telescope, the clearance gauge including reference marks which can be brought into coincidence with the reference marks on the marker to establish the correct observation position.

It will be appreciated that the term "telescope" is used here in a broad sense including in particular a monocular field glass such as will be described below or a pair of binoculars.

The clearance gauge, which is preferably interchangeable to allow clearances for different loads to be assessed, may show the profile of a particular load which is to be transported or may show a profile of the free space which is considered necessary for the passage of the load. It may be convenient in some cases for the clearance gauge to show both of these profiles. The clearance gauge may conveniently be in the form of a transparent plate on which the appropriate profile and the reference marks are marked. This plate may be placed in the optical path of telescope at the common focus of the objective and the eyepiece. The image of the actual clearance profile at the point being surveyed is superimposed on the desired profile represented by the clearance gauge and the assessment of the clearances is thus greatly assisted.

The invention will now be described in more detail with the aid of an example illustrated in the accompanying drawings, in which:

BRIEF DESCRIPTION OF THE DRAWING FIGURES

FIG. 1 is a perspective view of a railway track with surveying apparatus, including a field glass, set up to assess the clearances at a point along the track by the method of the invention;

FIG. 2 is a diagram of the picture seen by the observer through the field glass of FIG. 1; and FIG. 3 is a schematic diagram of the optical system of the field glass.

DETAILED DESCRIPTION OF THE INVENTION

Referring first to FIG. 1, this shows a conventional railway track 1. A marker 2 has been placed on the track at a position adjacent a signalling post 3, which will serve as an example of the obstacles determining the clearance profile. At a distance L along the track from the marker 2 and at a height H above the track a monocular field glass 4 is supported on a tripod 5. In this example the distance L is 50 meters and the height H is 1.20 meters.

The field glass 4 incorporates a clearance gauge which presents in the field of view, as shown in FIG. 2, a profile 6 representing the area required for the passage of a particular load. The profile 6, is of course, dimensioned according to the observation distance L. The clearance gauge also includes reference marks 7 and 8 which can be brought into coincidence with corresponding marks 9 and 10 on the marker 2 which, along with the signalling post 3 and the adjacent track, is visible through the field glass 4. When the reference marks coincide this establishes that the field glass 4 is at the correct observation distance L from the marker, which is a bar which extends transversely across the rails. The field glass 4 should also be at the correct height H and should have its line of sight perpendicular to the marker bar but with a long distance L small deviations in height and direction are of minor importance.

Examination of the position of the post 3, as seen in the field of view of the field glass, relative to the profile 6 now enables the clearances to be assessed in a very simple manner.

As shown in FIG. 3, the monocular field glass 4 has a housing 18 which is mounted on a table 19 carried by the tripod 5. Within the housing 18 is an objective 20 and an eyepiece consisting of lenses 21 and 22. A prism 23 and a mirror 24 serve to fold the ray path and thus shorten the overall length of the field glass in conventional manner and also to invert the image formed by the objective 20. A clearance gauge 25 formed of two glass plates with an outline diagram sandwiched between them is positioned at the common focus of the objective and the eyepiece.

When making a survey, a photographic record may also be made by means of a suitable camera attachment to the field glass 4, thereby obtaining a permanent record of various points along the right-of-way. In this manner, when an unusual load later is to be transported, a profile representation of such load, having the same scale as the record photographs, may be employed for example in overlay fashion with the photographs to determine the clearances, if any; with respect to the unusual load. In this fashion, the need for a further survey along most if not all of the actual right-of-way may be avoided. For example, various positions or points at which obviously ample clearance is present would be eliminated for actual further survey whereas points which indicate may close or questionable clearance from the photographic record may be selected for careful on-the-site survey.

What is claimed is:

1. A method of surveying clearances on a railway track comprising placing a marker at a point to be surveyed and observing the marker from a distance along the track by means of a telescope which incorporates a clearance gauge visible in the field of view of the telescope, the clearance gauge including reference marks which are brought into coincidence with corresponding reference marks on the marker to establish the correct observation position, whereupon obstacles at the point to be surveyed are observed relative to the clearance gauge to determine whether the clearances are sufficient, said clearance gauge representing the profile of a load to be transported.

2. A method as claimed in claim 1 in which the telescope is a monocular field glass.

3. Apparatus for surveying clearances on a railway track comprising a marker to be placed at the point to be surveyed, the marker having reference marks observable from a distance along the track, and a telescope incorporating a clearance gauge visible in the field of view of the telescope, the clearance gauge including reference marks which can be brought into coincidence with the reference marks on the marker to establish the correct observation position, said clearance gauge representing the profile of a load to be transported.

4. Apparatus as claimed in claim 3 in which the clearance gauge is interchangeable.

5. The method of surveying along a railroad track to determine if sufficient clearance exists to clear a railroad car having an oversize transverse profile, which comprises the steps of:
   (a) recording a reduced outline of said oversize transverse profile;
   (b) superimposing the reduced outline of said oversize transverse profile in the common focus of the objective system and the ocular of an optical instrument;
   (c) sighting the optical instrument along the railroad track in the direction of a suspected obstacle and focussing the instrument so that its object plane contains such obstacle and orienting said superimposed outline for establishing its correct position with respect to the railway track;
   (d) effecting said sighting at that predetermined distance from the obstacle which causes said outline to appear in the same dimensional scale at said object plane as does the obstacle; and
   (e) determining the clearance, if any, between said superimposed outline and the obstacle.

6. The method according to claim 5 which includes the step of placing a marking device transversely of the railroad track adjacent the obstacle and, during step (c), aligning the superimposed outline with the marking device to effect the orientation of the outline with respect to the railroad track.

* * * * *